(12) United States Patent
Litwiller

(10) Patent No.: US 10,688,499 B2
(45) Date of Patent: Jun. 23, 2020

(54) ORGANIC MATERIAL AND PLANT VINE CHOPPER ASSEMBLY

(71) Applicant: Sheldon Litwiller, Buhl, ID (US)

(72) Inventor: Sheldon Litwiller, Buhl, ID (US)

( * ) Notice: Subject to any disclaimer, the term of this patent is extended or adjusted under 35 U.S.C. 154(b) by 0 days.

(21) Appl. No.: 15/669,893

(22) Filed: Aug. 4, 2017

(65) Prior Publication Data

US 2019/0150367 A1    May 23, 2019
US 2019/0281769 A9    Sep. 19, 2019

Related U.S. Application Data

(60) Provisional application No. 62/371,206, filed on Aug. 4, 2016.

(51) Int. Cl.
| | |
|---|---|
| B02C 18/00 | (2006.01) |
| B02C 18/14 | (2006.01) |
| A01G 3/00 | (2006.01) |
| B02C 18/18 | (2006.01) |
| A01F 29/04 | (2006.01) |
| A01G 17/02 | (2006.01) |

(52) U.S. Cl.
CPC ............ *B02C 18/142* (2013.01); *A01F 29/04* (2013.01); *A01G 3/00* (2013.01); *A01G 3/002* (2013.01); *A01G 17/023* (2013.01); *B02C 18/14* (2013.01); *B02C 18/184* (2013.01); *B02C 2018/147* (2013.01); *B02C 2201/066* (2013.01)

(58) Field of Classification Search
CPC ..... B02C 18/184; B02C 18/142; B02C 18/14; B02C 18/147; A01G 3/002

USPC .......................................................... 241/294
See application file for complete search history.

(56) References Cited

U.S. PATENT DOCUMENTS

| | | | | |
|---|---|---|---|---|
| 2,294,098 A | * | 8/1942 | Stromer | B02C 4/30 241/294 |
| 4,607,800 A | * | 8/1986 | Barclay | B02C 18/0084 241/159 |
| 4,901,929 A | * | 2/1990 | Barclay | B02C 18/142 241/236 |
| 5,100,069 A | * | 3/1992 | Barclay | B02C 18/142 241/236 |
| 5,152,469 A | * | 10/1992 | Dicky | B02C 18/142 241/166 |
| 5,580,010 A | * | 12/1996 | Barclay | B02C 18/182 241/236 |

(Continued)

*Primary Examiner* — Faye Francis
(74) *Attorney, Agent, or Firm* — Charles R. Clark

(57) ABSTRACT

An organic material and plant vine chopper assembly has two plant vine chopper rotor drum assemblies that chop plant vines and other organic material. Each rotor drum assembly has a plurality of rotor rings each ring having a plurality of angled blades that effectively cooperate with each other to guard each blade and the drum against the wrapping of clogging fibrous strands and other clogging material around the drum. Each chopper rotor drum assembly incorporates a plurality of rotor rings spaced along and encircling and attached to a main drum tube and distributed in a cutting zone along and surrounding the longitudinal rotational axis of the drum tube with each rotor ring having a pair or a plurality of pairs of cutting blades attached to respective alternately angled mounting tabs that alternate to the left and to the right to the general plane of the rotor ring.

6 Claims, 12 Drawing Sheets

(56) References Cited

U.S. PATENT DOCUMENTS

| | | | | |
|---|---|---|---|---|
| 6,343,755 B1 * | 2/2002 | Barclay | ............... | B02C 18/142 |
| | | | | 241/236 |
| 6,854,676 B2 * | 2/2005 | Dubech | ............... | B02C 18/184 |
| | | | | 241/236 |
| 7,100,855 B2 * | 9/2006 | Diemunsch | ........... | B02C 18/142 |
| | | | | 241/236 |
| 7,810,531 B2 * | 10/2010 | Labbe | ................... | A01G 23/00 |
| | | | | 144/231 |
| 10,272,440 B2 * | 4/2019 | Lietaer | ............... | B02C 18/2216 |
| 2011/0266382 A1 * | 11/2011 | Labbe | ................. | A01G 23/093 |
| | | | | 241/294 |

* cited by examiner

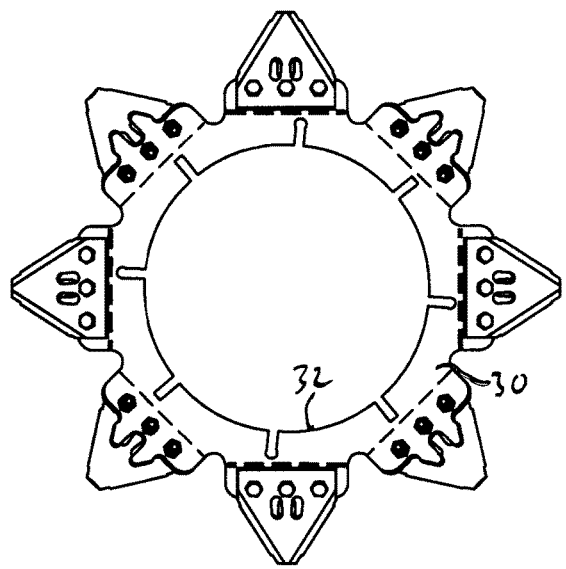
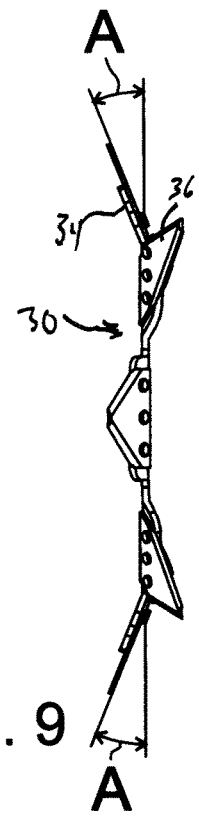
FIG. 8
FIG. 9
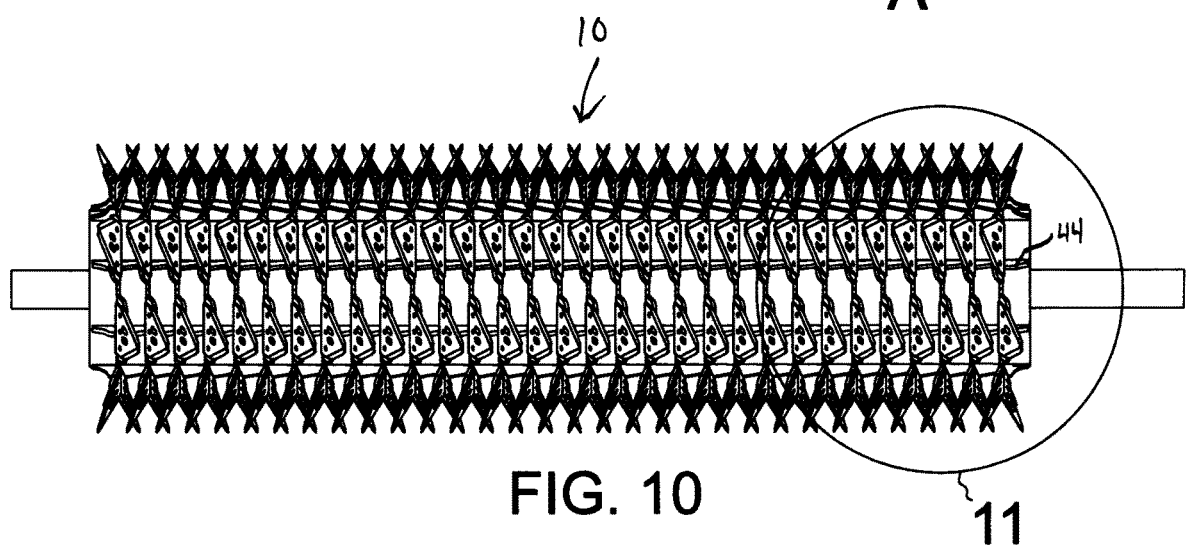
FIG. 10

190

210
120

210
120

US 10,688,499 B2

ORGANIC MATERIAL AND PLANT VINE CHOPPER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Field of the Invention

The present invention relates to providing an improved ORGANIC MATERIAL AND PLANT VINE CHOPPER ASSEMBLY 8 having two plant vine chopper rotor drum assemblies 10 that chops plant vines and other organic material to a finer and more consistent chopped product than other preexisting chopper devices have achieved. Preexisting choppers having rotating cutting drums are often plagued by plant vines and other fibrous strands wrapping around the drum that results in a clogging or decrease in the chopping effectiveness of the drum and that requires the user to stop the drum rotation to pull away or to cut away the clogging strands or other clogging material. The present invention provides two cooperating rotor drums having a plurality of rotor rings each ring having a plurality of angled blades that effectively cooperate with each other to guard each blade and the drum against the wrapping of clogging fibrous strands and other clogging material around the drum. The stream of material interacting with the present invention likely is met in a cutting zone of the drum by angled cutting edges of blades that have overlapping circular sweeps of the blades distributed along the longitudinal axis of the drum along the length of the cutting zone of the drum.

The present invention is less susceptible to clogging or fouling by fibrous strands or other material; the rotor drums of the present invention slice fibrous strands before the strands can wrap and clog the rotor drums and the chopped product resulting from use of the present invention will have an improved consistency over a product resulting from use of chopping machines that use other preexisting rotating cutter drums.

The invention incorporates two improved chopper drum assemblies that lessen the likelihood of clogging of the cutting drums by fibrous strands or other material by increasing the likelihood that the strands and other material will be effectively sliced by angled edges of blades that sweep in overlapping angled cutting arcs along the length of the cutting zones of the drums.

Each plant vine chopper rotor drum assembly incorporates a plurality of spaced rotor rings spaced along and oriented around a main drum tube 20 and distributed in a cutting zone along and around the longitudinal rotational axis of the drum tube with each rotor ring having a pair or a plurality of pairs of cutting blades attached to respective alternately angled mounting tabs that alternate to the left and to the right to the general plane of the rotor ring. The angle of the mounting tabs is selected from a range of ten to forty-five (10 to 45) degrees leftward or rightward from the general plane of the rotor ring. In a best embodiment, the angle of each pair of the mounting tabs alternates twenty-two and half (22.5) degrees to the left and to the right as shown in FIGS. 2 and 7.

In the best embodiment generally planar and triangular sickle blades are attached to the angled tabs as shown in FIGS. 8 to 12 with the two cutting edges of each blade projecting outward along converging lines away from the center of the rotor ring.

Preferably the rotor rings are spaced along the rotor drum such that the sweep circle of the cutting edges of the blades of the leftward angled tabs of one rotor ring overlap the sweep circle of the cutting edges of the blades of the rightward angled tabs of adjacent rotor rings.

The invention provides an operator with an improved rotor drum that has the ability to chop fibrous organic material and plant vines without the material and vines wrapping around and fouling the drum.

BRIEF SUMMARY OF THE INVENTION

A principal objective of the invention is to provide a manufacturer, farmer or other user with an improved chopper that has two cooperating rotor drum assemblies that can chop fibrous organic material and plant vines without the material and vines wrapping around the drums and fouling the drums that is simple, low-maintenance, and reliable.

Additional and various other objects and advantages attained by the invention will become more apparent as the specification is read and the accompanying figures are reviewed.

BRIEF DESCRIPTION OF THE SEVERAL VIEWS OF THE DRAWING

FIG. 8 is a is an axial view of an eight tab rotor ring 30 mounted with eight blades that around the circumference of the ring alternative upward or downward to the general central plane of the central portion of the ring;

FIG. 9 is a side view of the eight tab rotor ring shown in FIG. 8 showing two selected leftward angles (Angle A) from the general plane of said ring of the leftward angled tab selected from a range of ten (10) to forty-five (45) degrees during fabrication of each said ring, preferably the angle is twenty-two and half (22.5) degrees and showing a selected reference line rightward angle (Angle B) from the general plane of said ring of the rightward angled tab selected from a range of ten (10) to forty-five (45) degrees during fabrication of each said ring that will be swept by the rightward blade, preferably the angle is twenty-two and half (22.5) degrees (view is oriented transverse to one pair of angled blade mounting tabs);

FIG. 10 is a side view of a plant vine chopper rotor drum assembly 10;

DETAILED DESCRIPTION OF THE INVENTION

Referring to FIGS. 1 to 22, the present invention is a novel organic material and plant vine chopper assembly 8 having two cooperating vine chopper rotor drum assemblies mounted in a chopper cabinet 16.

Figure 1:
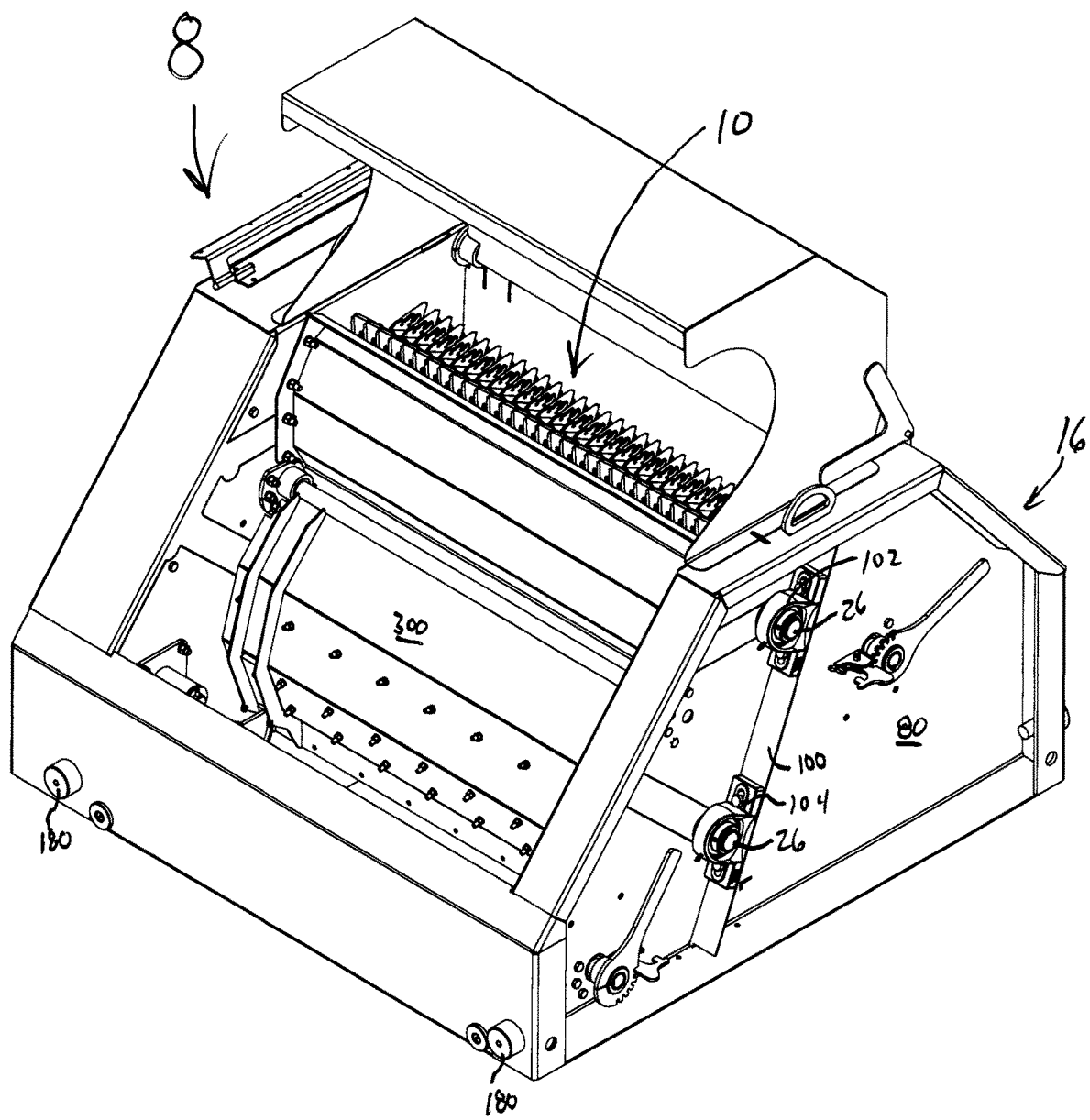
FIG. 1 is a perspective view of a organic material and plant vine chopper assembly 8.
Figure 2:
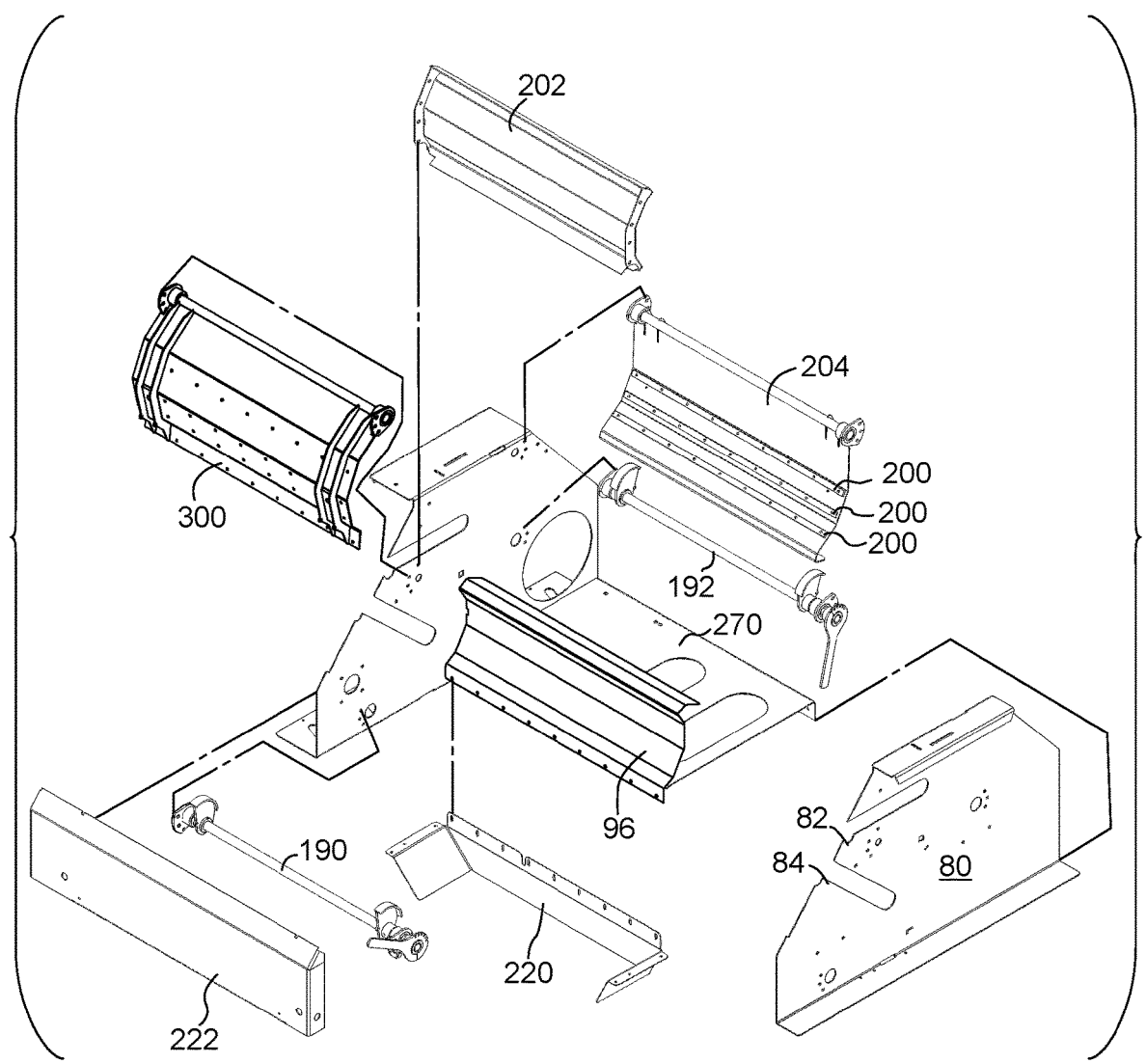
FIG. 2 is a partially exploded, perspective view of a chopper assembly cabinet 50.
Figure 3:
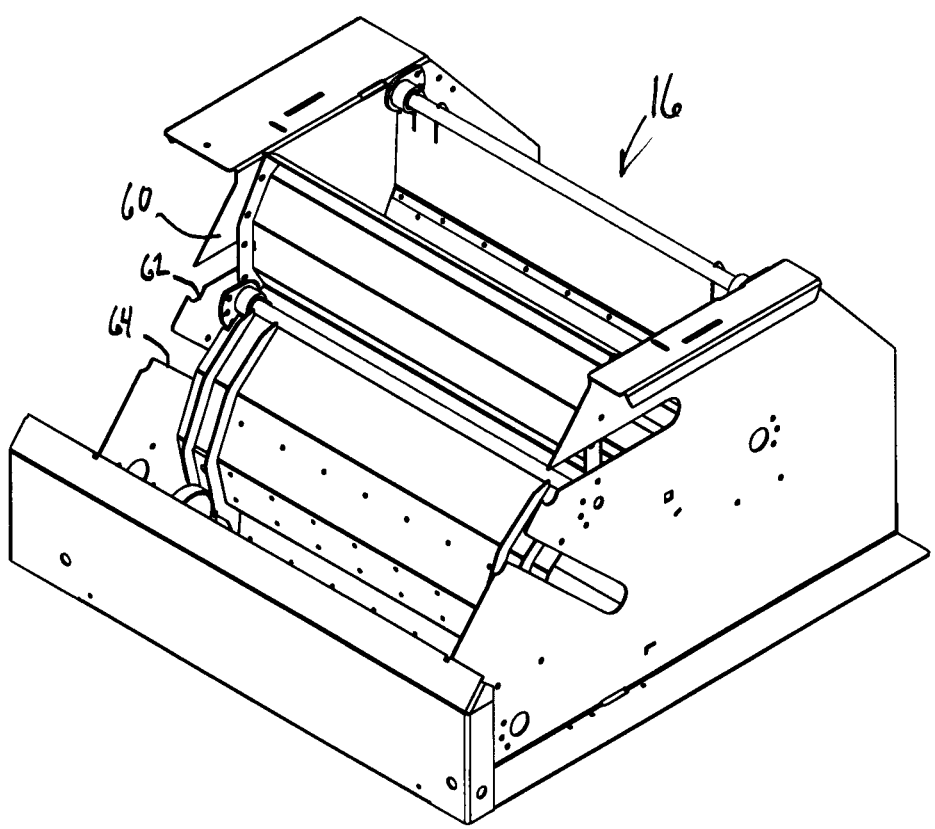
FIG. 3 is an assembled perspective view of the components shown in FIG. 2.
Figure 4:
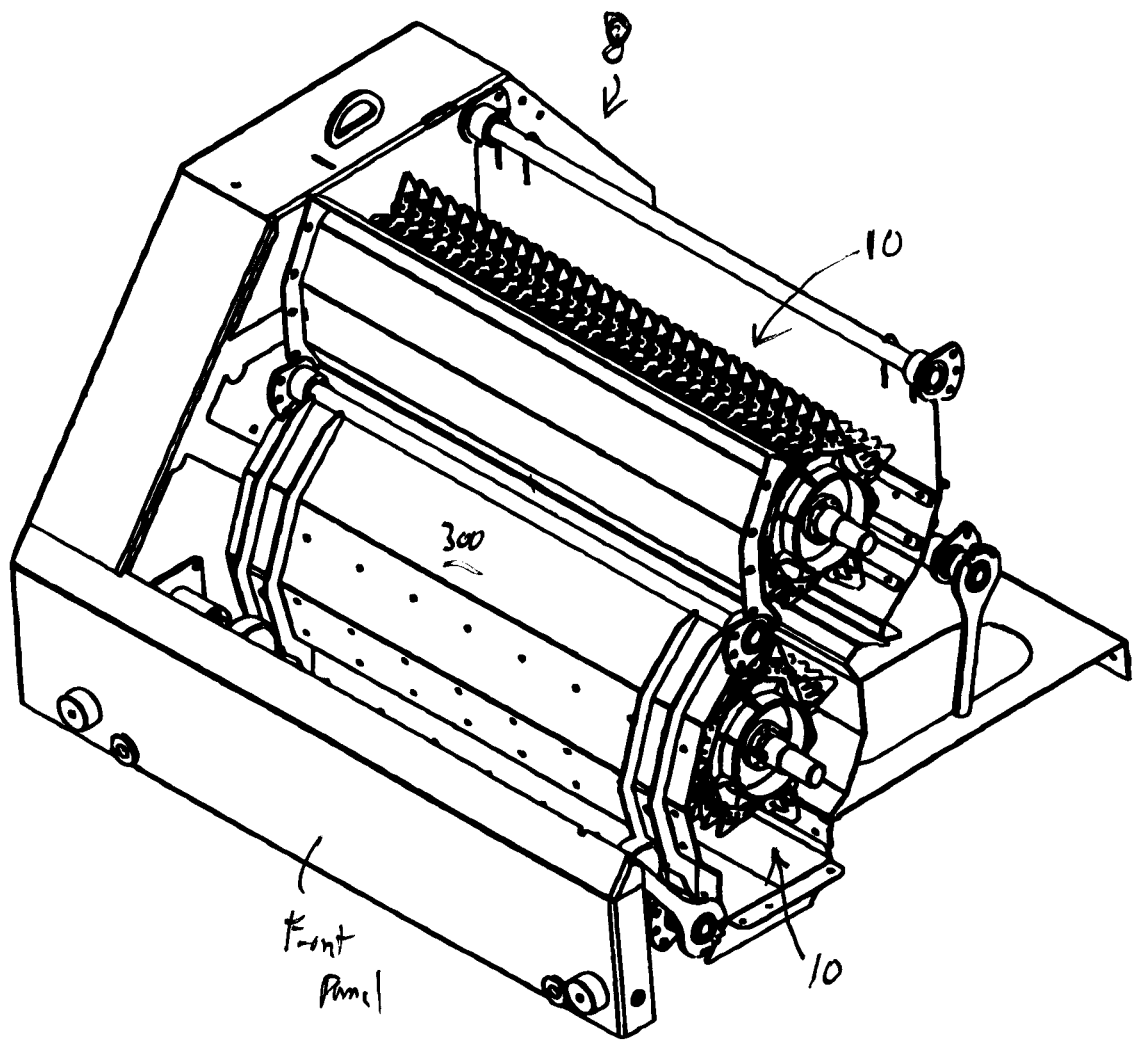
FIG. 4 is a partial, perspective view of the vine chopper assembly showing the two spaced plant vine chopper rotor drum assemblies and two hinged cages and two stationary cages that surround and help define the cutting zone for process material that is introduced into the chopper assembly.
Figure 5:
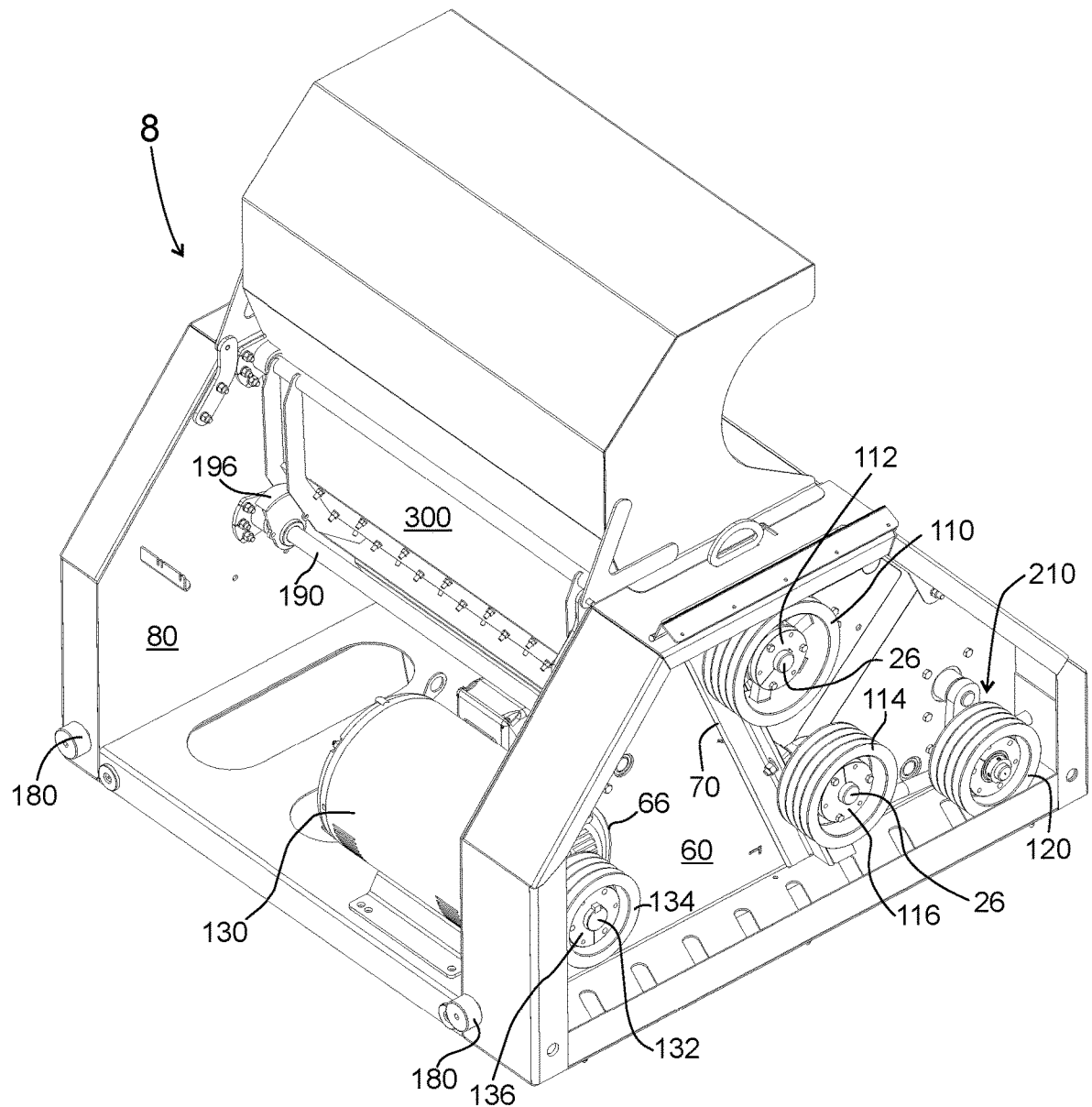
FIG. 5 is a perspective view of the chopper assembly viewed from the left showing the a chopper drive motor 130.
Figure 6:
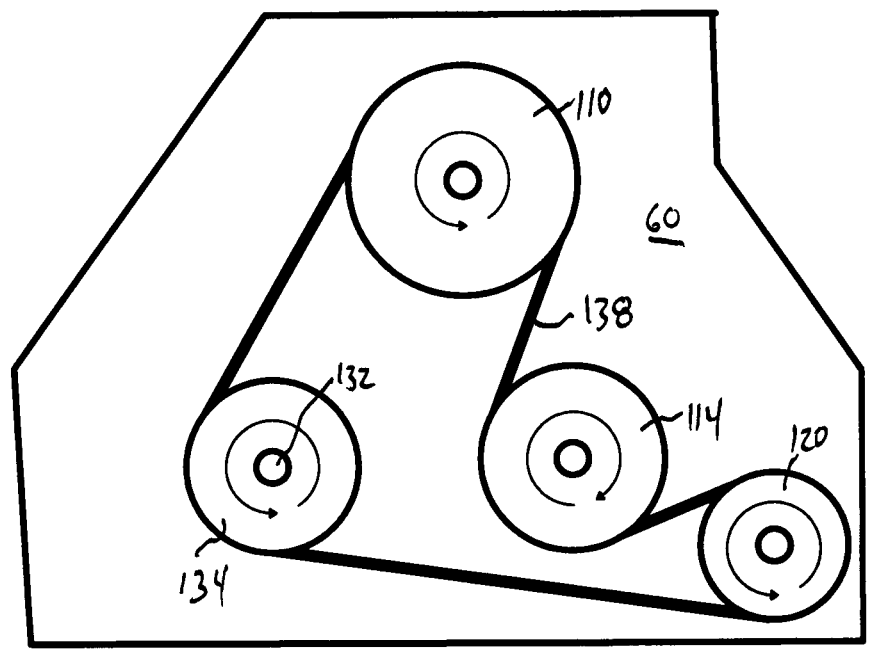
FIG. 6 is a simplified end view of the chopper assembly showing the arrangement and rotation directions of the sheaves 110, 114, 120, and 134 of the chopper assembly.
Figure 7:
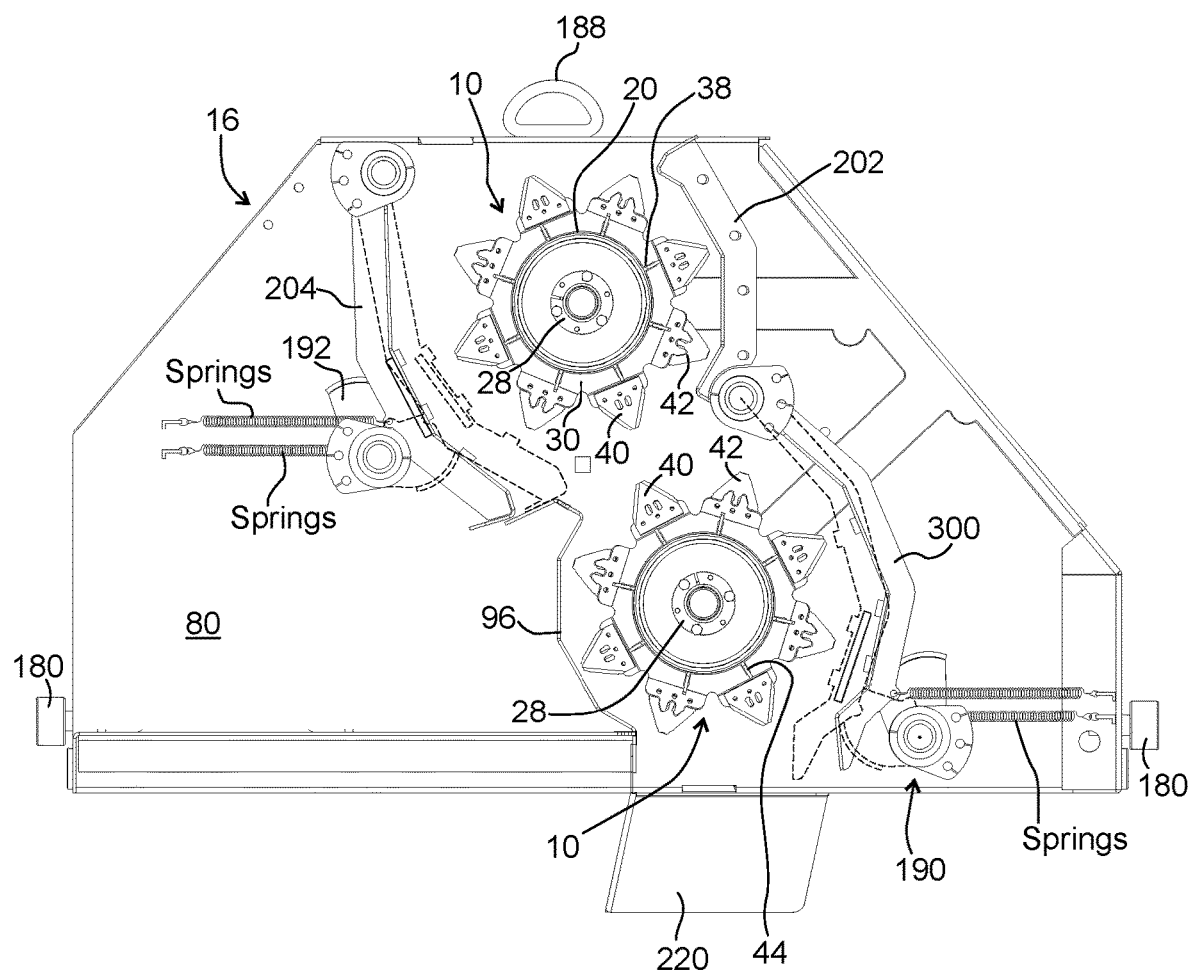
FIG. 7 is a left end partially hidden view of the an end view from the left side of the chopper assembly with various components not shown to show the interrelationships of the rotor drum assemblies 10 and the rotor drum panels and the chopper right end panel 80.
Figure 11:
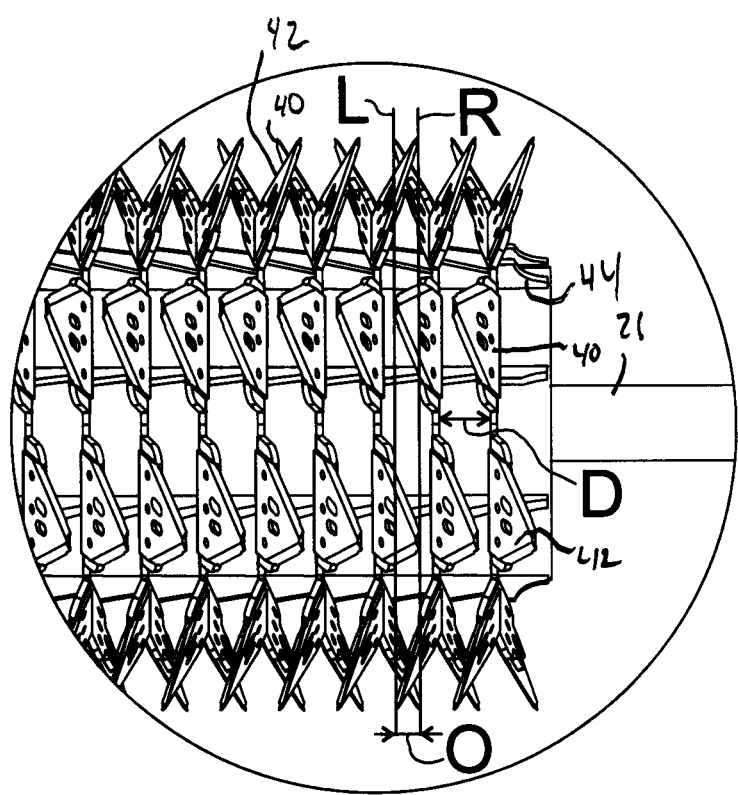
FIG. 11 is an enlarged circled portion of the side view of the plant vine chopper rotor drum assembly 10 shown in FIG. 10 and showing spaced reference lines L and R that indicate the rotational planes of the respective tips of the blades and shows that the tips overlap a distance O that can be selected during manufacture by selecting a separation distance D between adjacent rings (can be accomplished by varying distances between or among the comb rail slots.
Figure 12:
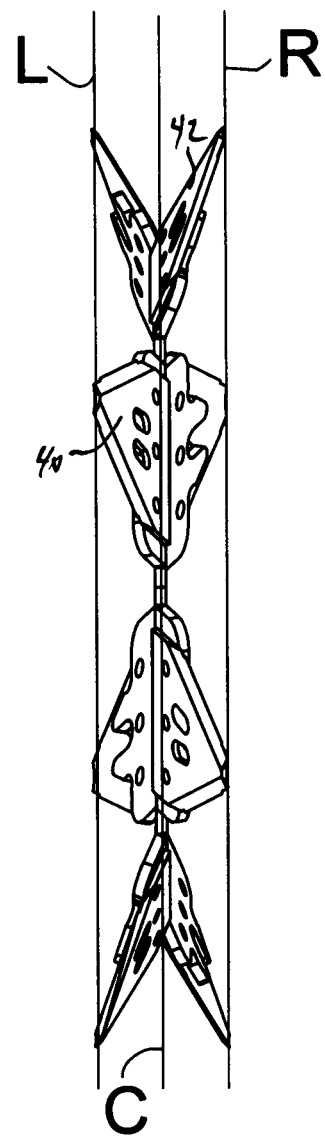
FIG. 12 is an axial view of an eight tab rotor ring 30 mounted with eight blades that around the circumference of the ring alternative leftward or rightward to the general central rotational plane C of the central portion of the ring.
Figure 13:
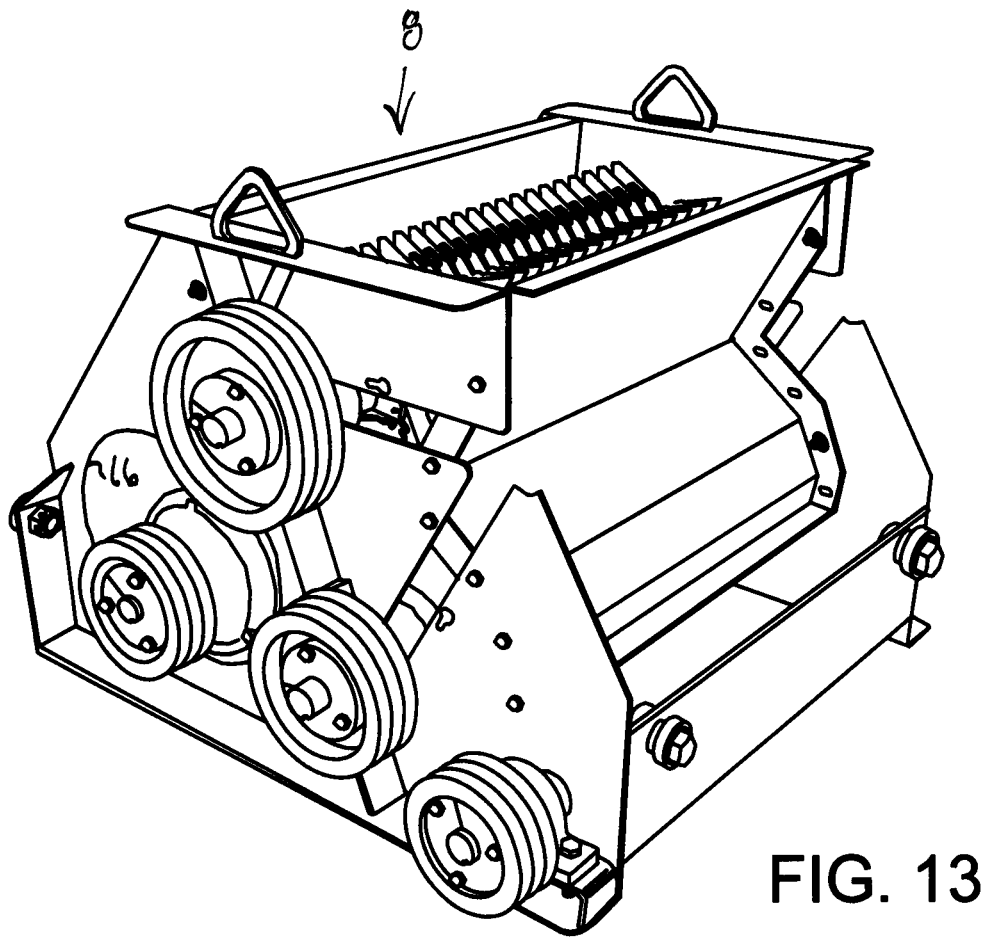
FIG. 13 is a perspective view of a plant vine chopper assembly 108.
Figure 14:
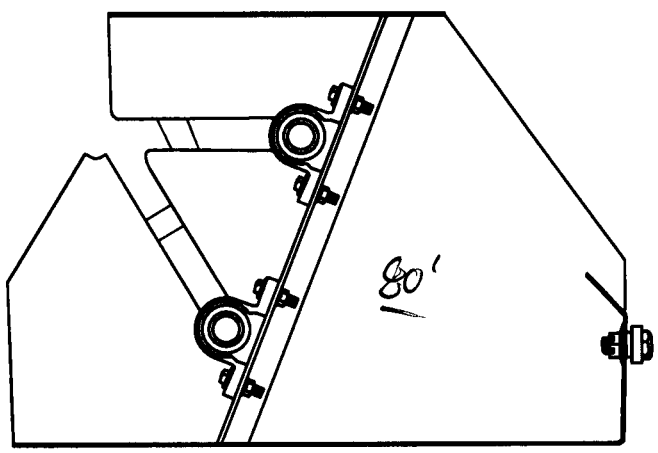
FIG. 14 is an end view of the cabinet viewed from the right end of the cabinet.
Figure 15:
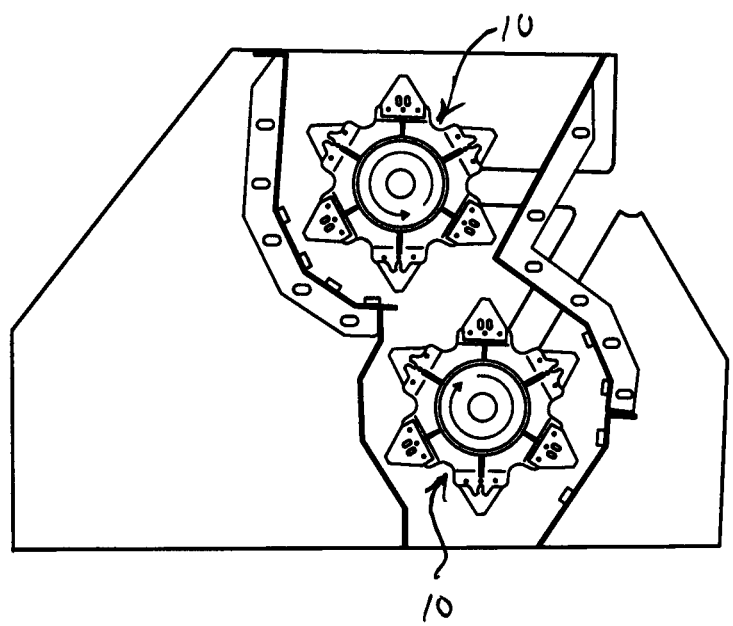
FIG. 15 is an end view from the left side of the chopper assembly with various components not shown to show the interrelationships of the rotor drum assemblies and the rotor drum panels and the chopper right end panel.

The elements of the invention, a organic material and plant vine chopper assembly 8 comprise:
two vine chopper rotor drum assembly 10 each drum assembly having a
cutting zone along the length of a rotor drum tube comprising:
a rotor drum tube 20 having
two rotor hubs 22 attached coaxially one hub within each end of the drum tube;
two hub to drum collars 24 (if required to accommodate the diameter of the drum tube are mounted between the inside of the tube and the hub); a
main rotor drum shaft 26 inserted through and retained in said hubs and said drum tube by two rotor bushings 28 (sk style appropriate) (one rotor bushing at each end of the drum tube);
a plurality of generally planar rotor rings 30 attached to said drum tube, said plurality of rings selectively distributed along said drum tube within said cutting zone as shown in FIGS. 1, 4, and 10 with preferably the rings evenly spaced one from another;
each said ring having
a central drum aperture 32 perpendicular to the general plane of said ring and having one or more pairs of angled blade mounting tabs extending outward and across the center of the ring with one tab of the pair being
a leftward angled tab 34 and the other tab of the pair being a rightward angled tab 36, and having
one or more rotor comb slots 38 distributed around the periphery of said tube aperture, said comb slots preferably radiating outward toward the outer edge of the ring
a generally planar cutting blade 40, 42 attached generally coplanar to each angled tab preferably using nuts and bolts with appropriate apertures in said angled tab and said blade having cutting edges along two of the three sides of the blade, preferably said cutting blade is a generally triangularly shaped sickle blade, and one or more
rotor combs 44 having a plurality of spaced sequential ring slots;
said plant vine chopper rotor drum assemblies 10 rotatably and operatively mounted in
a chopper cabinet 16, said chopper cabinet comprising:
a chopper left end panel 60, having
a left end upper rotor shaft slot 62,
a left end lower rotor shaft slot 64,
a motor shaft aperture 66, and
preferably the cabinet is now constructed with a dogleg tensioner idler assembly
to put the drive belts under tension during use of the chopper;
an idler sheave shaft aperture 68;
an upper to lower left end rotor bearing mount 70 attached to said left end panel, having
a left end upper rotor bearing 72 removably attached to said left end rotor bearing mount, and a left end lower rotor bearing 74 removably attached to said left end rotor bearing mount;
an outer idler sheave bearing mount 76 having
an outer idler sheave bearing 77 removably attached to said idler sheave bearing mount;
an inner idler sheave bearing 78 attached to
an idler sheave cabinet cross-member 90;
a chopper right end panel 80, having
a right end upper rotor shaft slot 82, and
a right end lower rotor shaft slot 84;
the idler sheave cabinet cross-member 90 (see above);
a lower front rotor panel 92;
an upper front rotor panel 94;
a lower rear rotor panel 96;
an upper rear rotor panel 98;
elongated bolt slots 99 (said bolt slots allow adjustment of upper rotor panels horizontally toward or away from the upper rotor drum assembly);
an upper to lower right end rotor bearing mount 100 attached to said right end panel, having
an right end upper rotor bearing 102, and
a right end lower rotor bearing 104;
an upper rotor sheave 110;
an upper rotor sheave bushing 112;
a lower rotor sheave 114;
a lower rotor sheave bushing 116;
an idler sheave shaft 118;
an idler sheave 120;

an idler sheave bushing 122;
a drive motor 130;
a motor shaft 132;
a motor sheave 134;
a motor sheave bushing 136;
one or more drive belts 138;
a left end inner rotor slot cover 140;
a left end outer rotor slot cover 142;
a right end inner rotor slot cover 150;
a right end outer rotor slot cover 152;
a lower motor mount plate 160, having
a plurality of motor mounting holes 162,
one or more clearance holes 164,
one or more access holes 166, and
one or more venting holes 168;
a motor mount plate 170, having
a plurality of motor mounting holes 172,
a left side plate position adjusting slot 174, and
one or more right side plate position adjusting slots 176;
a plurality of transverse cabinet mounting rollers 180;
one or more mounting roller support tabs 182;
one or more cabinet lifting tabs 190;
a plurality of chopper rub bars 200;
a lower door tensioner assembly 190;
an upper door tensioner assembly 192;
a hinged lower front cage assembly 300;
an upper front cage assembly 202;
a bottom shield 220;
a hinged upper rear cage assembly 204;

In FIG. 9, Angle A is a selected leftward angle from the general plane of said ring of the leftward angled tab selected from a range of ten (10) to forty-five (45) degrees during fabrication of each said ring, preferably the angle is twenty-two and half (22.5) degrees. Not shown in FIG. 9, every other tab around each ring is formed during fabrication to a selected rightward angle from the general plane of said ring of the leftward angled tab selected from a range of ten (10) to forty-five (45) degrees during fabrication of each said ring, preferably the angle is twenty-two and half (22.5) degrees.

Figure 16:
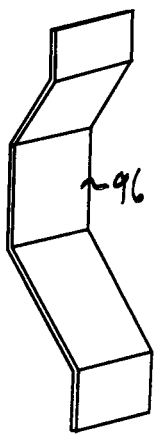
FIG. 16 is a perspective view of a lower rear rotor panel 96.
Figure 17:
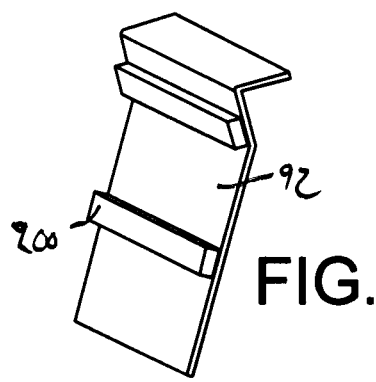
FIG. 17 is an perspective view of an lower front rotor panel 92.
Figure 18:
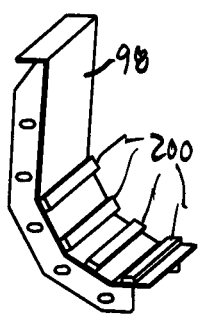
FIG. 18 is an end view of an upper rear rotor panel 98.
Figure 19:
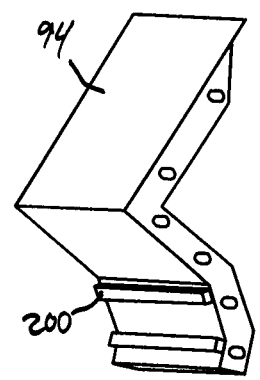
FIG. 19 is a perspective view of an upper front rotor panel 94.
Figure 20:
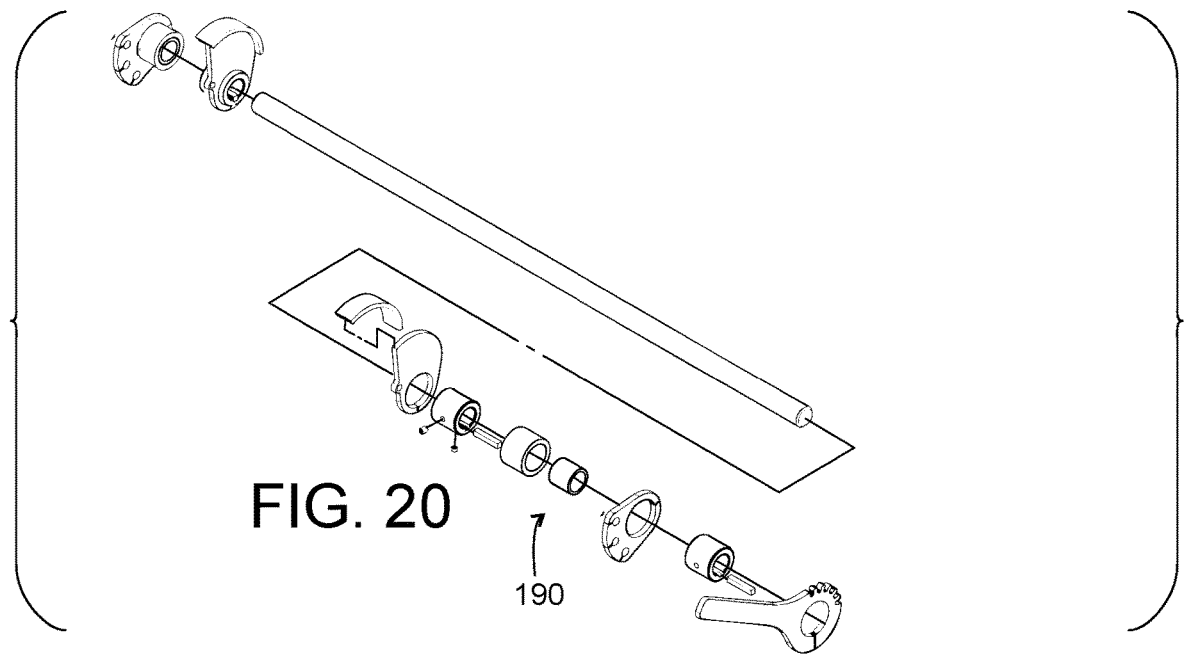
FIG. 20 is an exploded perspective view of a lower door tensioner assembly.
Figure 21:
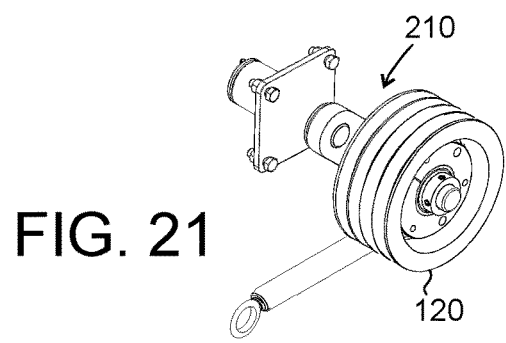
FIG. 21 is a perspective view of a dogleg tensioner idler assembly 210.
Figure 22:
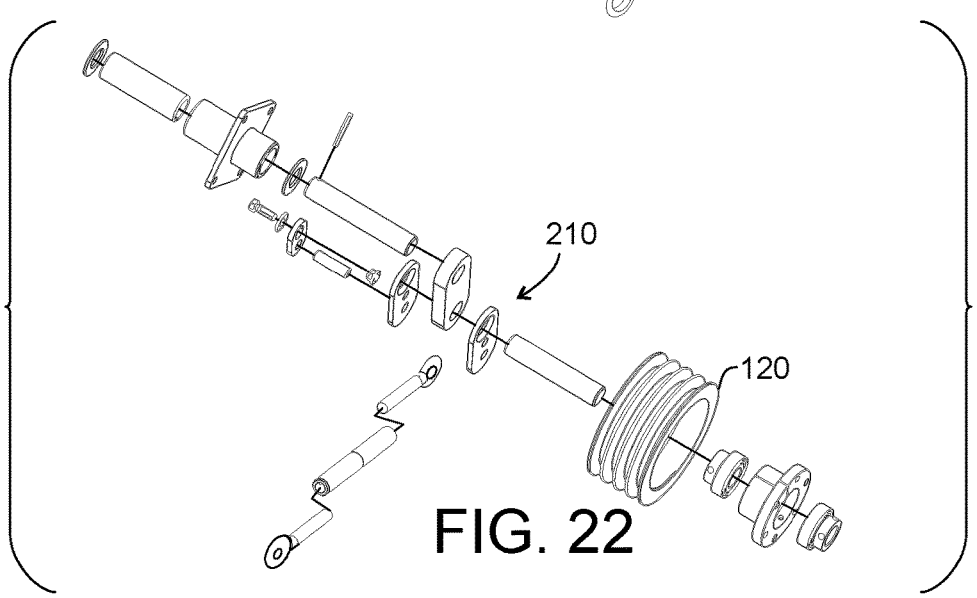
FIG. 22 is an exploded perspective view of the idler assembly shown in FIG. 21.

The rotor drum assemblies in the present embodiment are offset vertically twenty-one (21) degrees, see FIGS. 16 and 17, and can be offset in an alternate or modified cabinet having differently dimensioned and angled rotor slots in a selected range of one to forty-five (45) degrees.

A majority of the structural components of the invention are preferably made from sheet steel stock and round steel tubing stock, or other suitable materials used in making high strength agricultural equipment. Bearings and bushings are commonly available in the art and the bearings are pillow block bearings. Means of joining or attaching of elements of the invention one to another preferably may include welding and nuts and bolts.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. An organic material and plant vine chopper assembly comprising:
two chopper rotor drum assemblies rotatably and operatively mounted in a chopper cabinet; each said rotor drum assembly having a rotor drum tube having two rotor hubs attached coaxially one hub within each end of said drum tube; a main rotor drum shaft through and retained in said hubs and said drum tube by two rotor bushings with one rotor bushing at each end of said drum tube; a plurality of planar rotor rings spaced along and oriented around and attached to said drum tube, said plurality of rings selectively distributed along said drum tube within cutting zone with said rings evenly spaced one from another; each said ring having a central drum aperture perpendicular to the general plane of said ring and having a plurality of pairs of angled blade mounting tabs extending outward from and distributed along the circumference of said ring with one tab of each said pair being a leftward angled tab and the other tab of each said pair being a rightward angled tab, and having a plurality of rotor comb slots distributed around the periphery of said aperture, said comb slots radiating outward from and away from said aperture, a planar cutting blade attached coplanar to each tab; and one or more rotor combs distributed and attached to said drum tube around the outer circumference of drum tube and each said rotor comb having a plurality of spaced sequential ring slots.

2. An organic material and plant vine chopper assembly according to claim 1 wherein each said leftward angled tab having a selected leftward angle from the general plane of said ring selected from a range of ten (10) to forty-five (45) degrees and each said rightward angled tab having a selected rightward angle from the general plane of said ring selected from a range of ten (10) to forty-five (45) degrees.

3. An organic material and plant vine chopper assembly according to claim 1 wherein each said leftward angled tab having a leftward angle of 22.5 degrees from the general plane of said ring and each said rightward angled tab having a rightward angle of 22.5 degrees from the general plane of said ring.

4. An organic material and plant vine chopper assembly comprising:
two chopper rotor drum assemblies rotatably and operatively mounted in a chopper cabinet; each said rotor drum assembly having a rotor drum tube having two rotor hubs attached coaxially, one hub within each end of said drum tube; a main rotor drum shaft through and retained in said hubs and said drum tube by two rotor bushings with one rotor bushing at each end of said drum tube; a plurality of rotor rings spaced along and oriented around and attached to said drum tube, and said plurality of rotor rings selectively distributed along and around the longitudinal axis of said drum tube in a cutting zone with each said rotor ring having a central drum aperture perpendicular to the general plane of said ring, and each said rotor ring having a plurality of cutting blades attached respectively to a plurality of pairs of angled blade mounting tabs, said tabs extending outward from and distributed along the circumference of said ring with said tabs alternately angled leftward and rightward to the general plane of said rotor ring, and having one or more rotor comb slots distributed around the periphery of said drum aperture, said comb slots radiating outward from and away from said drum aperture, each said cutting blade attached coplanar respectively to one of said tabs; and one or more rotor combs distributed and attached to said drum tube around the outer circumference of said drum tube and each said rotor comb having a plurality of spaced sequential ring slots.

5. An organic material and plant vine chopper assembly according to claim 4 wherein each leftward angled tab having a selected leftward angle from the general plane of said ring selected from a range of ten (10) to forty-five (45) degrees and each rightward angled tab having a selected rightward angle from the general plane of said ring selected from a range of ten (10) to forty-five (45) degrees.

6. An organic material and plant vine chopper assembly according to claim 4 wherein each leftward angled tab having a leftward angle of 22.5 degrees from the general plane of said ring and each rightward angled tab having a rightward angle of 22.5 degrees from the general plane of said ring.

\* \* \* \* \*